July 31, 1945. E. S. THOMPSON Re. 22,656

FILTER CONTROL FOR AIRCRAFT ENGINES AND SUPERCHARGERS

Original Filed Nov. 25, 1942 2 Sheets-Sheet 1

Inventor:
Edward S. Thompson,
by Harry E. Dunham
His Attorney.

July 31, 1945. E. S. THOMPSON Re. 22,656

FILTER CONTROL FOR AIRCRAFT ENGINES AND SUPERCHARGERS

Original Filed Nov. 25, 1942 2 Sheets-Sheet 2

Inventor:
Edward S. Thompson,
by Harry E. Dunham
His Attorney.

Reissued July 31, 1945 Re. 22,656

UNITED STATES PATENT OFFICE 22,656

FILTER CONTROL FOR AIRCRAFT ENGINES AND SUPERCHARGERS

Edward S. Thompson, Marblehead, Mass., assignor to General Electric Company, a corporation of New York Original No. 2,368,501, dated January 30, 1945, Serial No. 466,849, November 25, 1942. Application for reissue April 21, 1945, Serial No. 589,468

15 Claims. (Cl. 244—102)

Figure 1:
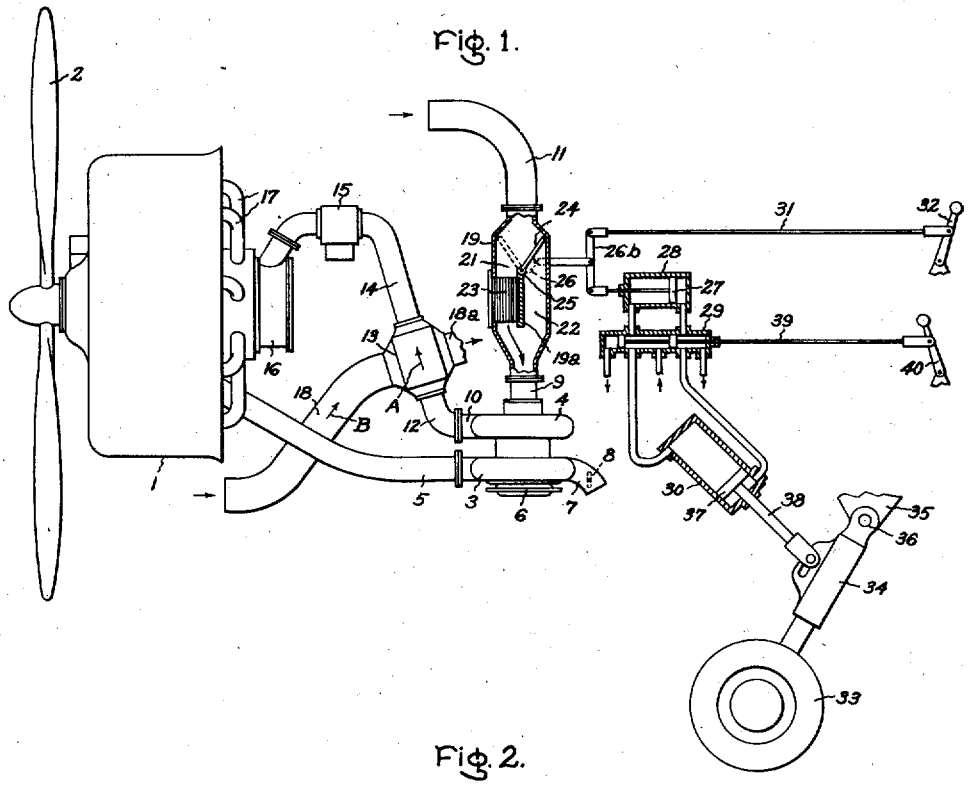

In connection with aircraft provided with engine superchargers, the condition obtains that the air in being compressed by the compressor of the supercharger is raised to a temperature well above that suited to engine operation, making it necessary to provide a cooling means for cooling the air on its way from the compressor to the carburetor. Usually, such cooling means is in the form of an air-cooled heat exchanger termed an intercooler, the cooling air being obtained from the aircraft slip stream. Air to the compressor and cooling air to the intercooler may be supplied by a single conduit or by separate air conduits.

To obtain effective cooling, the heat exchanger to be used as an intercooler must have relatively narrow passages for the flow of the air to be cooled and also preferably for the flow of the cooling air. A satisfactory heat exchanger used for this purpose is one of the laminar flow type which comprises flat plates of thin metal stacked flatwise, spaced to provide passages of small height between them, and arranged for the flow of cooling air through the passages between some of the plates and for the flow of the air to be cooled through passages between other of the plates.

In the use of intercoolers having passages of small dimensions, trouble may be experienced due to the passages becoming clogged by particles of foreign matter, such as dust, sand or the like entering with the air. To prevent this, it is desirable to provide a filter for the air to be cooled or for both the air to be cooled and the cooling air arranged in advance of the intercooler as regards the direction of the flow of air for separating out the foreign particles in the air.

Also, it is important to separate out any particles, such as grit, sand or dirt, in the air supplied to an aircraft engine to protect the engine itself from abrasive action due to such foreign particles reaching moving parts of the engine.

On the other hand, however, use of a filter is objectionable in that it increases the drop in pressure of the supercharged air, a thing it is important to avoid especially for high altitude flying since any increase in drop in pressure of the supercharged air means a decrease in the obtainable altitude. In general, foreign particles in the air are met with only in regions in the vicinity of the ground, the air well above the ground being free from foreign particles.

The object of my invention is to provide an improved construction and arrangement of filtering mechanism in connection with an aircraft engine or in connection with an aircraft engine and an intercooler whereby the filter will be in operation when the aircraft is flying in regions in the vicinity of the ground but will be out of operation in regions more remote from the ground.

For a consideration of what I believe to be novel and my invention, attention is directed to the following specification and to the claims appended thereto.

According to my invention, I provide a filtering means for the air supplied to the aircraft engine, or where an intercooler is used, for the air to be cooled, i. e., the air supplied to the engine, or for both the air to be cooled and the cooling air, so arranged that it may be in operation at regions in the vicinity of the ground and removed from operation in regions remote from the ground. To this end, means are provided for rendering the filter effective and ineffective and such means is arranged preferably to be operated either manually or automatically. For automatic operation, I may connect such means with a part of the aircraft which is normally moved from one position to another as the aircraft passes from a region in the vicinity of the ground to a region more remote therefrom. Such a mechanism, for example, may be the landing gear of an aircraft which in the vicinity of the ground is down in landing position, and in regions more remote from the ground is retracted. However, the means may be under the control of any other suitable condition appurtenant to the operation of the aircraft.

Referring to the drawings, Fig. 1 is a diagrammatic view of a construction embodying my invention; and Figs. 2, 3, 4, and 5 are similar views of modifications.

In the drawings I have elected to illustrate my invention in a system wherein an intercooler is provided. It is to be understood, however, that the invention has utility in protecting an aircraft engine and that it may be used where no intercooler is provided.

Referring to the drawings, 1 indicates an aircraft engine driving a propeller 2. Air is supplied to the engine by a turbosupercharger comprising a gas driven turbine 3 and a centrifugal compressor 4. Gases for operating the turbosupercharger are supplied to the gas driven turbine through engine exhaust manifold 5. The turbine wheel of the gas turbine is indicated at 6. At 7 is the usual waste conduit connected with the nozzle box of the gas turbine and provided with a waste gate valve 8 which is operated in a well known way for regulating the speed of the turbo-supercharger. The inlet conduit for compressor 4 is indicated at 9 and the discharge conduit is indicated at 10. Air to the compressor inlet 9 is supplied by a conduit 11 which may face into and take air from the slip stream of the aircraft. Compressor discharge conduit 10 is connected by a conduit 12 to the inlet side of an intercooler 13. Air to be cooled flows from conduit 12 through intercooler 13 and thence through an intercooler discharge conduit 14 to carburetor 15. From carburetor 15, the air is supplied to a gear driven supercharger 16 which, in turn, distributes the air to intake pipes 17 leading to the several cylinders of the engine. Intercooler 13 may be of any suitable construction. Preferably, as pointed out above, it comprises a plurality of flat plates of thin metal stacked flatwise and spaced to provide passages of small height between them, the air to be cooled flowing through every other passage in the direction indicated by the arrow A and the cooling air flowing through the remaining passages between the plates in the direction indicated by the arrow B. Cooling air may be conveyed from the slip stream to the intercooler through a suitable conduit 18 and may be conveyed therefrom through a conduit 18a to a suitable discharge point.

The construction and arrangement so far described is a known one and is to be taken as typical of any suitable supercharger arrangement for an aircraft engine.

Referring to the embodiment of my invention shown in Fig. 1, I provide conduit 11 with an enlarged section 19 which is divided by a partition 19a into two branches 21 and 22 in one of which there is provided a suitable filter 23. In advance of the filter, I provide a suitable valve means, in the present instance in the form of a flap valve 24, mounted on a shaft pivotally supported in the wall of the enlargement 19, as is indicated at 25, and arranged so that it may be positioned to direct the air through either filter 23 or around the filter through the branch or passage 22 which by-passes the filter. When flap valve 24 is in the position shown in the drawings in full lines, the air is directed through filter 23. When the flap valve is moved to the position shown in the dotted lines, then the passage for flow of air through the filter is shut off and the air is directed through the passage 22. For operating flap valve 24, there is provided an arm 26 on the pivot pin of flap valve 24, which arm is connected by a link 26a to a floating lever 26b, one end of which is connected to the piston rod of a piston 27 which moves in a cylinder 28 and is actuated by fluid pressure controlled by a pilot valve 29 which is the same pilot valve which controls the supply of actuating fluid to a fluid actuated motor 30 for actuating the landing gear. The other end of floating lever 26 is connected by a rod 31 to a hand lever 32.

The landing gear is shown only diagrammatically, one of the wheels of the landing gear being indicated at 33 and being shown as carried by the arm 34 pivoted on a fixed support 35 as indicated at 36. The piston 37 of the hydraulic motor for operating the landing gear is connected to arm 34 by a piston rod 38. The movable element of pilot valve 29 is connected by a rod 39 to the landing gear control lever 40.

In the drawings, the landing gear is shown as being in its down or landing position, pilot valve 29 being positioned to supply actuating fluid to the upper end of cylinder 30 and at the same time supplying actuating fluid to the left-hand end of cylinder 28, thus holding flap valve 21 in the position shown in Fig. 1. Pilot valve 29 is of known type, the directions of the flow of operating fluid through it being indicated by the arrows. The fluid pressure controlled by the pilot may be obtained from any suitable source. To retract the landing gear, the operator moves the hand lever 40 toward the right, as viewed in Fig. 1, to reverse the position of pilot valve 29, admitting fluid pressure to the lower end of cylinder 30 and permitting it to discharge from the upper end thereof whereupon piston 37 is moved upward in cylinder 30 to retract the landing gear. At the same time, movement of pilot valve 29 operates to connect the right-hand end of cylinder 28 to the fluid pressure supply, the left-hand end being connected to a discharge pipe of the pilot valve. Piston 27 is then moved toward the left to move flap valve 21 from the full line position to the dotted line position. Thus it will be seen that as long as the landing gear is down, the filter is in use and when the landing gear is retracted, the filter is automatically put out of service, it being then by-passed, so to speak.

At any time, valve 24 may be positioned manually by hand lever 32, the manual control overriding, so to speak, the automatic control.

Figure 2:
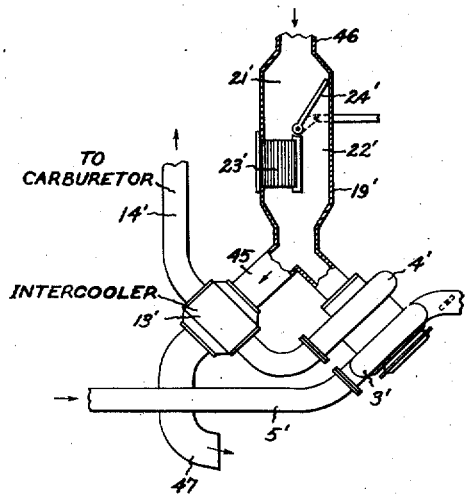

In the arrangement shown in Fig. 1, the filter is arranged to filter only the air supplied to the compressor, i. e., the air to be supercharged. In Fig. 2 is shown an arrangement wherein the filter filters both the air to be supercharged and the cooling air. To this end, conduit 45, corresponding to conduit 18 of Fig. 1, which supplies cooling air to the intercooler is connected with the air supply conduit 46, corresponding to air supply conduit 11 of Fig. 1, cooling air and air to be cooled being thus supplied to the compressor and to the intercooler from a common inlet in which the filter is located. Cooling air is discharged from the intercooler through a conduit 47. Otherwise, the arrangement shown in Fig. 2 may be the same as that shown in Fig. 1 and the same reference characters with a prime added have been used to designate corresponding parts.

Figure 3:
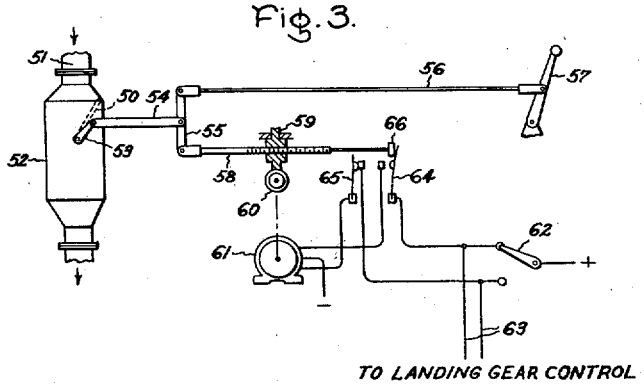

In the case of an electrically operated landing gear, the valve means for directing the flow of air through either the filter or the by-pass may be operated by means of a reversing electric motor, the circuits for which are controlled by the same switch lever which operates the landing gear. Such an arrangement is illustrated in Fig. 3 wherein 50 indicates a flap valve corresponding to the flap valve 24 of Fig. 1 located in the air intake conduit 51 and operating to direct air through the filter or through the by-pass around the filter contained in the enlargement 52 corresponding to enlargement 19 of Fig. 1. On the spindle of flap valve 50 is fixed an arm 53 connected by a link 54 to a floating lever 55, one end of which is connected by a rod 56 to a hand lever 57, corresponding to hand lever 32 of Fig. 1, and the other end of which is connected to a threaded rod 58 on which is located a worm wheel 59, the bore of which is screwed on the threads on rod 58. Meshing with worm wheel 59 is a worm 60 driven from the shaft of a reversing electric motor 61. The worm wheel 59 is free to turn but is supported against movement in an axial direction. Accordingly, when it turns, it effects a longitudinal movement of the threaded rod 58. The circuits for motor 61 are connected to the hand switch 62 which is used to control the reversing electric motor which raises and lowers the landing gear for the aircraft. In other words, motor 61 has its control connected in parallel to the control for the landing gear. The electric leads to the landing gear control are indicated at 63. In the circuits for the reversing motor 61 are suitable limit switches 64 and 65 operated by a head 66 carried on the end of rod 58. In the position of the parts shown in Fig. 3, the flap valve 50 is in a position to direct the air through the filter, the landing gear being down. If the position of switch 62 is reversed to operate the landing gear motor to raise the landing gear, it at the same time closes a circuit on motor 61 to operate the motor in a direction to move rod 58 toward the left, thus reversing the position of flap valve 50. At the end of its movement, head 66 opens limit switch 65 to stop motor 61. During the operation limit switch 64 is permitted to close. The parts will remain in this position as long as switch 62 is left in the position to which it has been moved. When switch 62 is reversed in position to lower the landing gear, then it closes the circuit on motor 61 to operate motor 61 in the opposite direction to move flap valve 50 back to the position shown in Fig. 3, limit switch 65 being closed and limit switch 64 being open during the operation. At any time valve 50 may be operated manually by means of hand lever 57.

Figure 4:
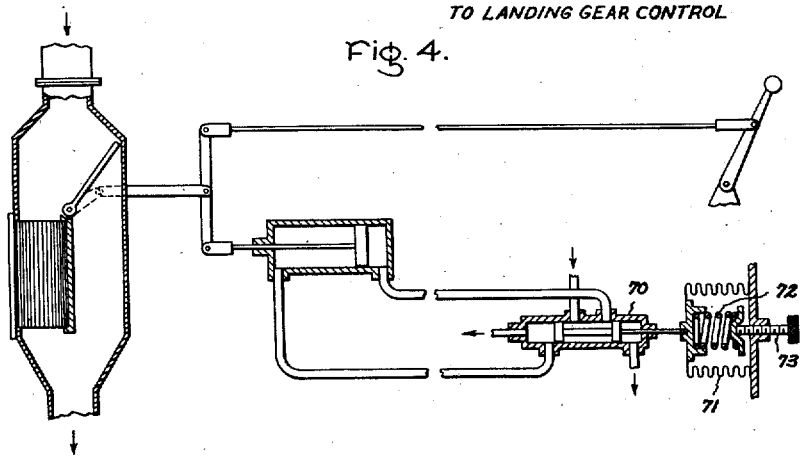

In Fig. 4 is shown an arrangement wherein the valve means controlling the flow of air through the filter is operated automatically by means responsive to the altitude of the aircraft. To this end, the pilot valve 70, corresponding to pilot valve 29 of Fig. 1, has its stem connected to an absolute pressure gauge or altimeter 71, the spring 72 of which may be adjusted by means of a hand screw 73. Otherwise, the construction shown in Fig. 4 may be similar to that shown in Fig. 1 or that shown in Fig. 2. With this arrangement, the operator by adjusting hand screw 73 may set the altimeter to operate at an altitude a certain amount higher than that of the landing field, it being set so that when an altitude a certain amount higher than that of the landing field is reached, bellows 71 of the altimeter will be distended by spring 72 to reverse the position of pilot valve 70, thereby effecting a reversal of the position of the flap valve in the manner already described. A suitable scale may be provided in connection with the hand screw 73 to enable the operator to correctly set the altimeter.

Figure 5:
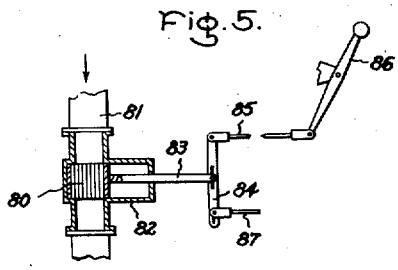

Instead of moving a valve to direct the flow of air through the filter, I may move the filter itself into and out of the path of flow of the air. In other words, instead of moving the air flow stream with respect to the filter, I may move the filter with respect to the air flow stream. Such an arrangement is shown in Fig. 5 wherein the filter 80 is movable from a position across the air flow conduit 81 (corresponding to conduit 11 of Fig. 1, conduit 46 of Fig. 2, conduit 51 of Fig. 3 or the inlet air conduit of Fig. 4) to a position at one side of the conduit. To this end, conduit 81 is provided with a pocket 82 on one side of a size to house the filter and into which the filter may be moved. In the arrangement illustrated, the filter is connected by a rod 83 to a floating lever 84 one end of which is connected by a rod 85 to a hand lever 86 and the other end of which is connected by a rod 87 to the automatic operating mechanism. It will be understood that the filter arrangement shown in Fig. 5 may be used in any of the arrangements shown in Figs. 1 to 4 inclusive.

By operating the filter control flap valve automatically by a means appurtenant to an operating condition of the aircraft, such as the landing gear operating means, I avoid adding to the aircraft another device which the operator of the aircraft is called upon to operate manually. This is important for already an aircraft operator has many controls to take care of and it is undesirable to add to the number. At the same time, the result is effected that the filter is in operation only at such times as it is needed.

Removing the filter from operation at higher altitudes is very important since a filter in the air intake system may reduce the critical altitude of an aircraft an amount of the order of 25 per cent or even more due to drop in pressure of the air in flowing through the filter; and, in the case of an aircraft provided with a turbo-supercharger or other variable speed type supercharger, an operator may, in increasing the supercharger speed in attempting to hold a constant intake manifold pressure, overspeed and damage the supercharger.

While I have described my invention as applicable particularly in protecting an intercooler, an internal combustion engine, or both, it is to be understood that the invention, in its broader aspects, is not limited thereto necessarily but may be utilized for the protection of other aircraft parts or elements.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. The combination with an aircraft having a retractable landing gear, a supercharger for supplying supercharged air to the aircraft engine, and an intercooler for cooling the supercharged air, of an air filter for the supercharger, and means connected with the landing gear for rendering said filter effective or ineffective.

2. The combination with an aircraft having a retractable landing gear, a supercharger for supplying supercharged air to the aircraft engine, and an intercooler for cooling the supercharged air, of an air filter for the supercharger, and means operated from the landing gear control for rendering said filter effective or ineffective.

3. The combination with an aircraft having a retractable landing gear, a supercharger for supplying supercharged air to the aircraft engine, and an intercooler for cooling the supercharged air, of a conduit through which air is supplied to the supercharger, a filter for such air, and means operated simultaneously with the operation of the landing gear for effecting flow of such air through said filter only when the landing gear is down.

4. The combination with an aircraft, a supercharger for supplying supercharged air to the aircraft engine, an intercooler for cooling the supercharged air and a conduit through which air is supplied to the supercharger, of a filter for such air which is normally out of the path of flow of the air, and means operated automatically by an operating force related to the altitude of the aircraft for effecting flow of such air through the filter when the aircraft is in the vicinity of the ground.

5. The combination with an aircraft having a retractable landing gear and an engine, of an air filter for the air supplied to the engine, and means connected with the landing gear for rendering said filter effective or ineffective.

6. The combination with an aircraft having a retractable landing gear and an engine, of an air filter for the air supplied to the engine, and means operated simultaneously with the operation of the landing gear for effecting flow of such air through said filter only when the landing gear is down.

7. In combination, an aircraft having an engine, an air intake for the engine, a filter for the intake air normally out of the path of flow of such air, and means operated automatically by an operating force related to the altitude of the aircraft for effecting flow of such air through the filter when the aircraft is in the vicinity of the ground.

8. The combination with an aircraft having a part to which air is supplied, of a filter for such air normally out of the path of flow of such air, and means operated automatically by an operating force related to the altitude of the aircraft for effecting flow of such air through the filter when the aircraft is in the vicinity of the ground.

9. The combination with an aircraft having a retractable landing gear and a part to which air is supplied, of a filter for such air, and means connected with the landing gear for rendering said filter effective and ineffective.

10. The combination with an aircraft having a retractable landing gear, and a part to which air is supplied, of a filter for such air and means operated simultaneously with the operation of the landing gear for effecting flow of such air through said filter only when the landing gear is down.

11. In an aircraft installation, a supercharger, an intercooler, a single conduit for supplying air to the supercharger and cooling air to the intercooler, a filter for such air, and automatic means actuated in response to changes in a force related to the altitude of the aircraft for removing said filter from the path of flow of such air.

12. The combination with an aircraft having a retractable landing gear, a supercharger for supplying supercharged air to the aircraft engine, and an intercooler for cooling the supercharged air, of an air filter for the supercharger, means connected with the landing gear for rendering said filter effective or ineffective, and manual means operable independently of said first-named means for rendering said filter effective or ineffective.

13. The combination with an aircraft having a retractable landing gear, and a supercharger for supplying supercharged air to the aircraft engine, of a conduit through which air is supplied to the supercharger, a filter for such air, means operated simultaneously with the operation of the landing gear for effecting flow of such air through said filter only when the landing gear is down, and manual means operable independently of said first-named means for rendering said filter effective or ineffective.

14. The combination with an aircraft having a retractable landing gear, and a supercharger for supplying supercharged air to the aircraft engine, of a conduit through which air is supplied to the supercharger, a filter, and means operated by the landing gear for moving the filter into and out of the path of flow of the air through said conduit when the landing gear is lowered and raised.

15. The combination with an aircraft having a retractable landing gear, a supercharger for supplying supercharged air to the aircraft engine, and an intercooler for cooling the supercharged air, of a conduit through which air is supplied to the supercharger, a filter, means operated by the landing gear for moving the filter into and out of the path of flow of the air through said conduit when the landing gear is lowered and raised, and manual means for moving the filter into and out of the path of flow of the air through said conduit independently of said landing gear.

EDWARD S. THOMPSON.